Sept. 3, 1957 G. E. INMAN 2,805,308

PHOTOELECTRIC CRYSTAL MOUNTING

Filed July 14, 1953

Inventor:
George E. Inman,
by Vernet C. Kauffman
His Attorney

United States Patent Office
2,805,308
Patented Sept. 3, 1957

2,805,308

PHOTOELECTRIC CRYSTAL MOUNTING

George E. Inman, East Cleveland, Ohio, assignor to General Electric Company, a corporation of New York Application July 14, 1953, Serial No. 367,797

6 Claims. (Cl. 201—63)

This invention relates in general to photoelectric devices, and more particularly to an arrangement for mounting semiconductive crystals in sealed vitreous envelopes which achieves improved performance and ruggedness.

The invention is of particular advantage in connection with the mounting in vitreous envelopes of semi-conductive elements or crystals of the photoconductive type. The impedance of such crystals varies in accordance with the intensity of the incident radiation. This characteristic is made use of by passing a current through the crystal, the intensity of the current or the voltage drop across the crystal then serving as the signal for controlling dependent apparatus. A crystal particularly suitable for this purpose is disclosed in copending application No. 190,801, filed October 16, 1950, of John E. Jacobs, now Patent No. 2,706,790, entitled "X-Ray Detection," and consists of a cadmium sulphide crystal substantially free from lattice distortion. These crystals, consisting of hexagonal cadmium sulphide, may be synthesized from cadmium vapor and hydrogen sulphide. Other photosensitive elements are germanium semiconductors.

Such photoconductive crystals are generally fragile and sensitive to moisture, so that in order to have a reliable and practical photoelectric device, it is necessary to provide a suitable mounting, preferably a hermetically sealed one. In my copending application, Serial No. 312,761, filed October 2, 1952, now Patent No. 2,740,875, entitled "Photoelectric Device," and assigned to the same assignee as the present invention, I have disclosed and claimed a mounting arrangement wherein a photoconductive crystal of cadmium sulphide has its ends received into clamps formed by curling over the ends of the lead wires. In a preferred arrangement, the clamped ends of the crystal are coated with a conductive paste such as carbon or colloidal graphite in order to improve the rigidity of the mounting and the conductivity of the joints.

The object of my present invention is to provide a new and improved mounting for supporting a photosensitive crystal element within a vitreous bulb.

Another object of the invention is to provide a new and improved photocell structure comprising a photoconductive crystal.

In accordance with the invention, I provide a mounting arrangement which makes use of four leads or, more accurately, support wires, one pair for each end of the crystal. The two leads in each pair are formed so that they cross over and have a reverse bend or hook beyond the cross-over point. The ends of the crystal are inserted between the hook portions of the leads which are sprung momentarily to allow the crystal to be inserted, and the crystal is held mechanically through the scissor effect resulting from the spring tension of the leads. In a preferred embodiment, the hook portions of the leads and the ends of the crystal are coated with a suitable conductive paste to improve the rigidity of the mount and the conductivity of the joints.

For further objects and advantages and for a better understanding of the invention, attention is now directed to the following description and accompanying drawing.

The features of the invention believed to be novel will be more particularly pointed out in the appended claims.

Figure 1:
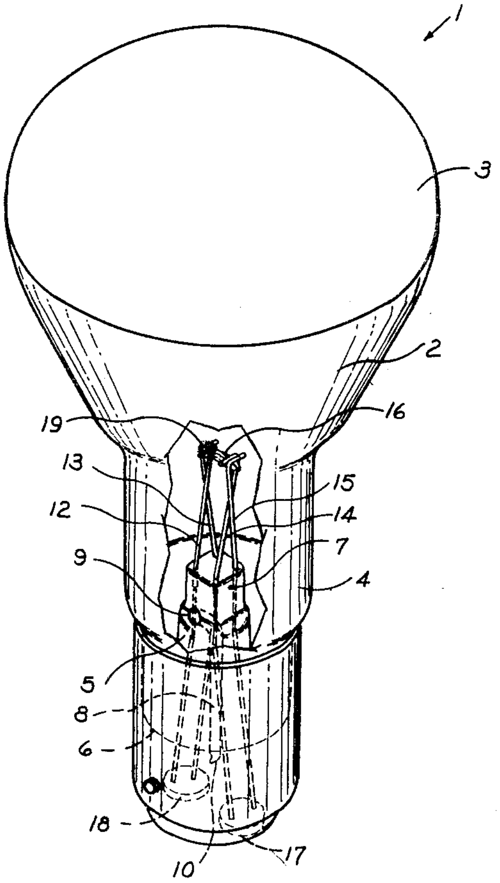
Fig. 1 is a much enlarged pictorial view of a photocell comprising a photoconductive crystal mounted in accordance with the invention in a hermetically sealed reflector type bulb.

Referring to Fig. 1, there is shown a photoelectric device 1 comprising a vitreous envelope having a silvered portion 2 of generally parabolic form and a clear convex end portion or face 3. The parabolic portion 2 merges into a tubular neck portion 4 and a re-entrant stem portion 5 is sealed at 6 to the end of the neck portion. The stem is formed at its upper end into a press 7 and an exhaust tube 8 projects downward through it, the juncture being made just below the press. An exhaust port at 9 is blown through the stem at the juncture to permit evacuation of the bulb through the exhaust tube which is tipped off at 10. Two pairs of lead wires 12, 13 and 14, 15 extend through the press into the bulb to support the photoelectric crystal 16 at approximately the focal point of the parabolic portion 2. It will be observed that the press 7 is generally rectangular in form and that the leads are sealed through it near its four corners. The external projections of the leads are connected to the contact eyelets 17, 18 in the bottom insulative wall of the base.

The crystal 16 which has been illustrated, is generally typical of cadmium sulphide crystals used for photoconductive elements. It will be observed that the crystal is elongated and irregular in shape; in fact, no two crystals are identical and, accordingly, the mounting arrangement must be relatively flexible. In accordance with the illustrated embodiment of the invention, the lead wires of each pair 12, 13 and 14, 15 are bent inwardly toward each other so as to cross over. Beyond the point of cross-over, they are bent sharply outwardly to form reverse bends or hook portions. In mounting the crystal the leads are bent just short of meeting at the intended cross-over point. Thereafter the leads are sprung together and the end of the crystal inserted between the overlapping hook portions. When the leads are released, their natural spring tension tends to make them bend away from each other in a scissor-like effect and the crystal is mechanically clamped between the overlapping hook portions.

The rigidity of the assembly and the conductivity of the joints may be improved by coating them with a suitable conductive paste or cement. Suitable substances are the commercial products known as dags, manufactured by the Atcheson Colloidal Graphite Company of Port Huron, Michigan. One suitable substance, known as aquadag, is an aqueous suspension of colloidal graphite; another is an alcoholic suspension of colloidal graphite. These materials, on drying, leave an adherent coating of carbon or graphite which improves the conductivity of the joints and which also prevents the joints from loosening. The coating has been shown by stippling in Fig. 1 on the left-hand side of the crystal only, namely at 19, in order not to obscure the arrangement of the lead wires.

In making the photocell, after the crystal 16 has been mounted on the lead wires, the stem 5 is sealed to the neck 4 of the bulb and the envelop is then exhausted, preferably with heating to a temperature in the range of 200 to 400° C., in order to remove moisture and occluded gases from its interior. The bulb may then be filled with an inert gas or a gas of high thermal conductivity, that is, a gas of low atomic weight such as hydrogen or helium. Helium is generally preferred, because it is inert. The filling pressure of the helium may be approximately 600 millimeters to permit atmospheric tipping of the exhaust tube 8. The provision of helium within the bulb provides a very decided improvement in the heat dissipating capacity of the crystal and allows a larger current through the crystal without destructive overheating.

Figure 2:
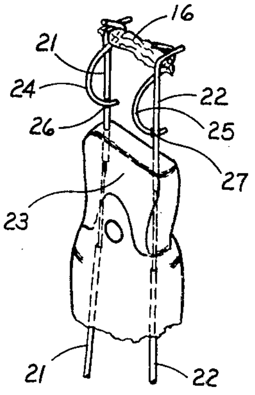
Fig. 2 is a fragmentary pictorial view of a mount for a photocell constituting a variant of the invention.

Fig. 2 illustrates a variant of my invention wherein only two lead wires 21 and 22 are sealed through a flat press 23. The desired scissor-like clamping effect is then achieved by welding transversely to each lead wire an additional support wire 24, 25, the welds being made near the points of emergence of the lead wires at 26 and 27. The support wires are then curved back and cross over their respective lead wires. Both the lead wires and the support wires are provided with reverse hooks immediately beyond the point of cross-over whereby to clamp the crystal 16 in similar manner to that in the embodiment of Fig. 1.

While certain specific embodiments of the invention have been shown and described, it will of course be understood that various modifications may be made without departing from the invention. The appended claims are, therefore, intended to cover any such modifications coming within the true spirit and scope of the invention.

What I claim as new and desire to secure by Letters Patent of the United States is:

1. A device comprising a hermetically sealed vitreous bulb, at least one pair of lead wires sealed through said bulb, an additional pair of support wires secured near the points where said lead wires emerge into said bulb, a semiconductive elongated crystal element connected across the ends of said lead wires, each lead wire and an adjacent support being crossed over and bent into reverse hook portions beyond the point of cross-over, and the ends of said crystal being received in said hook portions and mechanically clamped therein.

2. A photoelectric device comprising a hermetically sealed vitreous bulb, two pairs of lead wires sealed through said bulb, a photoconductive elongated crystal element connected across the ends of said lead wires, the lead wires within a pair being crossed over and bent into reverse hook portions beyond the point of cross-over, and the ends of said crystal being received in said hook portions and mechanically clamped therein.

3. A photoelectric device comprising a vitreous bulb, a re-entrant stem portion sealed into said bulb, a press formed in the inward projection of said stem and two pairs of lead wires sealed into said bulb through said press, a photoconductive crystal connected across the ends of said pairs of lead wires, the lead wires within a pair being crossed over and bent into reverse hook portions beyond the point of cross-over, and the ends of said crystal being received in said hook portions and mechanically clamped therein by the scissor-like effect resulting from the spring tension of said leads.

4. A photoelectric device comprising a vitreous bulb, a re-entrant stem portion sealed into said bulb, a press formed in the inward projection of said stem and two pairs of lead wires sealed into said bulb through said press, a photoconductive crystal connected across the ends of said pairs of lead wires, the lead wires within a pair being crossed over and bent into reverse hook portions beyond the point of cross-over, the ends of said crystal being received in said hook portions and mechanically clamped therein by the scissor-like effect resulting from the spring tension of said leads, a conductive paste coating the ends of said crystal and said hook portions, and a filling of a gas from the class consisting of helium and hydrogen sealed within said bulb in order to augment the heat dissipating capacity of said crystal.

5. A photoelectric device comprising a vitreous bulb, a re-entrant stem portion sealed into said bulb, a press formed in the inward projection of said stem and a pair of lead wires sealed into said bulb through said press, a pair of support wires, each lead wire having a support wire transversely fastened to it near said press, each support wire being curved around and crossed over its lead wire and the lead and support wires being bent into reverse hook portions beyond the point of cross-over, and a photoconductive crystal connected across said lead wires, the ends of said crystal being received in said hook portions and mechanically clamped therein by the scissor-like effect resulting from the spring tension of said wires.

6. A device comprising a hermetically sealed vitreous bulb, at least one pair of lead wires sealed through said bulb, and additional pair of support wires secured in said bulb, a semiconductive elongated crystal element connected across the ends of said lead wires, each support wire being crossed over the lead wire adjacent to it at a point removed from the secured end of the support wire and the lead and support wires being bent into reverse hook portions beyond the point of crossover, the ends of said crystal being received in said hook portions and mechanically clamped therein.

References Cited in the file of this patent

UNITED STATES PATENTS

| | | |
|---|---|---|
| 910,842 | McIntyre | Jan. 26, 1909 |
| 1,659,312 | Colwell | Feb. 14, 1928 |
| 1,976,312 | Wachsman | Oct. 9, 1934 |
| 1,978,165 | Metcalf et al. | Oct. 23, 1934 |
| 2,321,358 | Bokovoy | June 8, 1943 |
| 2,334,631 | Johnson | Nov. 16, 1943 |